April 30, 1940. J. R. THOMAS 2,199,295
CORRUGATING AND CROWNING MACHINERY
Filed Aug. 24, 1939 3 Sheets-Sheet 1
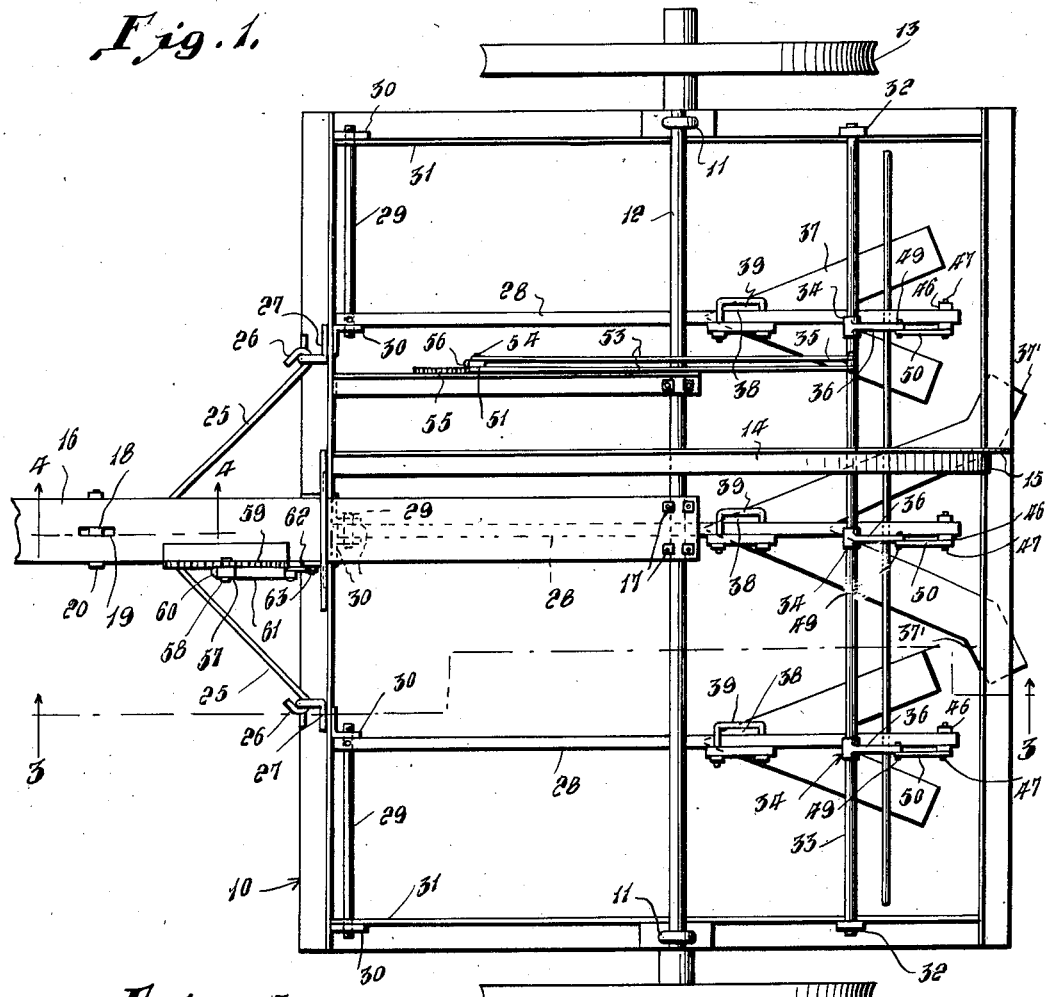
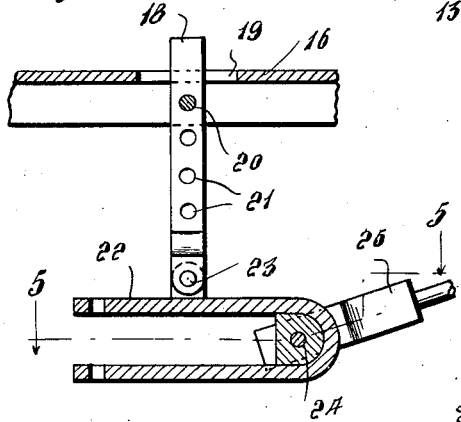
Inventor
J. R. Thomas
By L. F. Kendrick
Attorney April 30, 1940.  J. R. THOMAS  2,199,295
CORRUGATING AND CROWNING MACHINERY
Filed Aug. 24, 1939   3 Sheets-Sheet 2

Inventor
J. R. Thomas

By [signature]
Attorney

April 30, 1940. J. R. THOMAS 2,199,295
CORRUGATING AND CROWNING MACHINERY
Filed Aug. 24, 1939 3 Sheets-Sheet 3

Inventor
J. R. Thomas.

By L. F. Randolph
Attorney

Patented Apr. 30, 1940

2,199,295

UNITED STATES PATENT OFFICE 2,199,295

CORRUGATING AND CROWNING MACHINERY

Josiah R. Thomas, Parma, Idaho

Application August 24, 1939, Serial No. 291,785

6 Claims. (Cl. 97—144.1)

This invention relates to an implement or mechanism for treatment of the earth primarily in connection with irrigation and its aims to provide a novel machine which may be used either for the purpose of forming parallel corrugations or ditches to carry the water over ground to be irrigated or to be used for cutting off at the surface of or below the ground, any weeds or grasses as desired.

It is especially aimed to provide such an implement as will accommodate either corrugating tools or crowning tools as desired, and to provide a novel means for mounting such tools.

Another important object is to provide a mechanism wherein the tools and parts carrying the same, are adjustable as to elevation both at the front and at the rear in order that the height of operation may be varied and the angles of operation varied according to conditions.

The more specific objects and advantages will become apparent from a consideration of the description following taken in connetcion with the accompanying drawings illustrating an operative embodiment.

In said drawings:

Figure 1 is a plan view of the implement with tools attached for use as a crowner;

Figure 4 is a detail longitudinal sectional view taken on the plane of line 4—4 of Figure 1;

Figure 5 is a detail section taken on the plane of line 5—5 of Figure 4;

Figure 2:
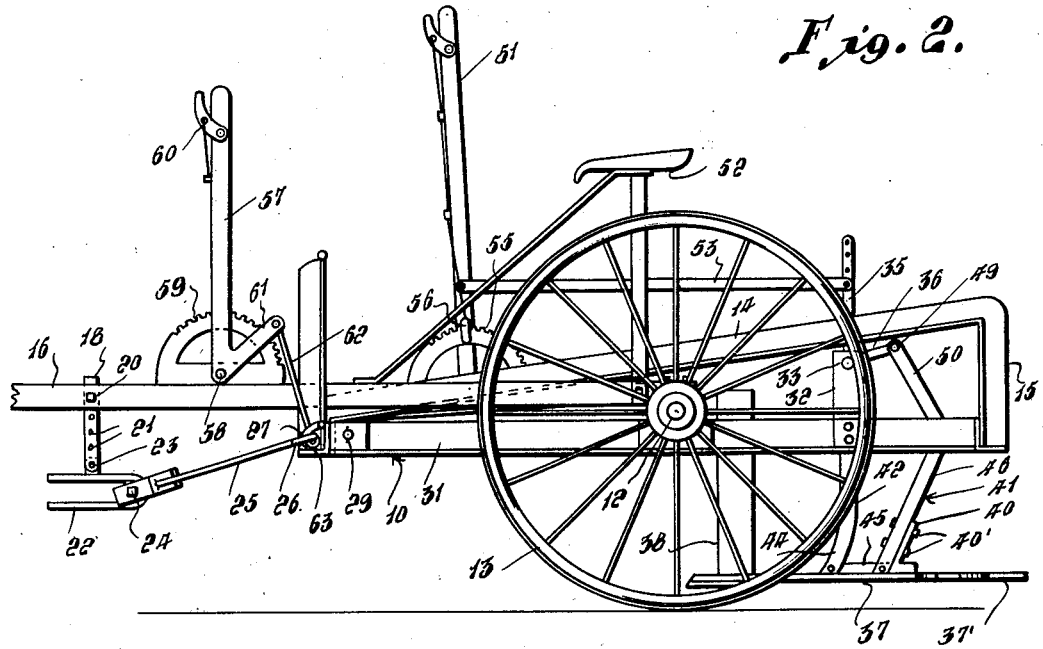
Figure 2 is a side elevation of the parts of Figure 1.
Figure 3:
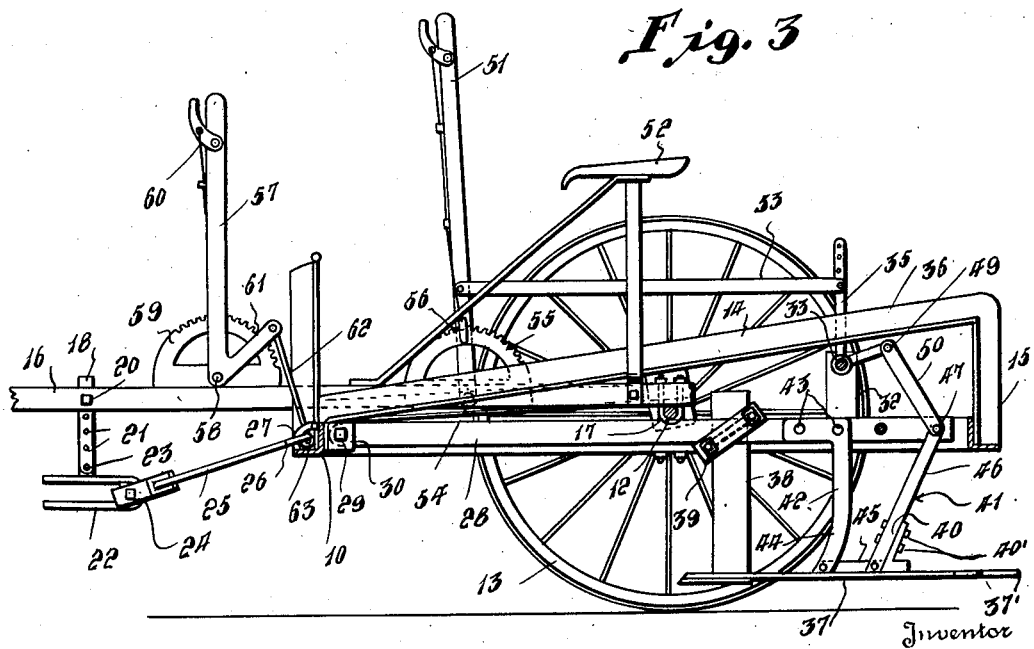
Figure 3 is a vertical sectional view taken on the line 3—3 of Figure 1.
Figure 6:
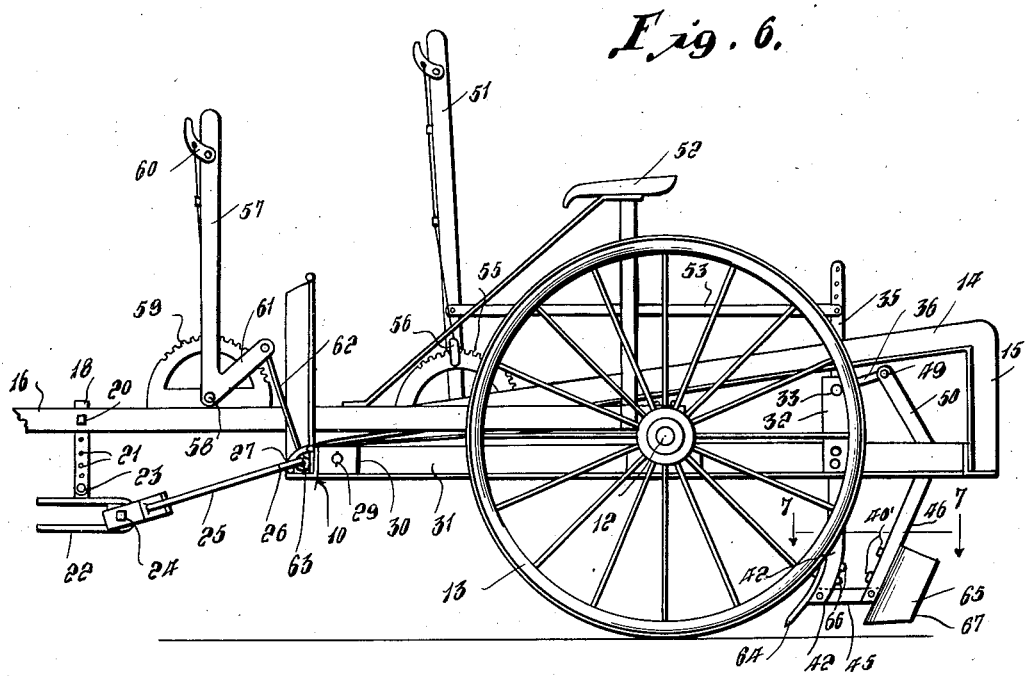
Figure 6 is a side elevation similar to Figure 2 but showing the use of corrugating shovels.

Referring specifically to the drawings wherein like reference characters designate like or similar parts, the implement employs a suitable frame at 10 of any desired size and shape and of either wood or metal. As shown, by way of example, it is rectangular and metallic. Frame 10 is fastened by means of U-bolts 11 to a transverse axle 12 which may be rigid within the bolts or rotatable as desired. On the axle 12 ground wheels 13 are carried. Substantially midway of the sides of the frame 10, it is reinforced by an angularly disposed beam 14, connected directly to the front of the frame and by a dependent 15 to the rear of the frame. At the front end, a draft or hitching pole is provided at 16, which is pivotally connected by U-bolts 17 to the axle 12. The tongue has a depending bar at 18, vertically adjustable through a slot 19 in the bar in cooperation with a removable bolt 20 carried by the beam and applicable to any of the openings 21 in the bar. At the lower end, a clevis 22 is pivoted at 23 to bar 18 and a bracket 24 is loosely or pivotally mounted in clevis 22 and has a draft yoke 25 extending rearwardly and pivotally therefrom whose outwardly flaring arms are hooked or otherwise connected as at 26 to anchors 27 at the front of frame 10.

Disposed longitudinally of the frame 10 are any desired number of tool-mounting beams 28, three of them being shown by way of example. Such beams at the front are pivotally mounted by means of rods or bolts 29 mounted by adjacent brackets 30 on the frame 10 or flanges 31 of portions of the frame.

Adjacent the rear of the beams 28, a pair of vertical standards 32 rise which mount a cross rod 33. Journaled on the cross rod 33 are bell crank levers 34, one for each beam 28, which levers have upstanding arms 35 and lateral arms 36.

Figure 7:
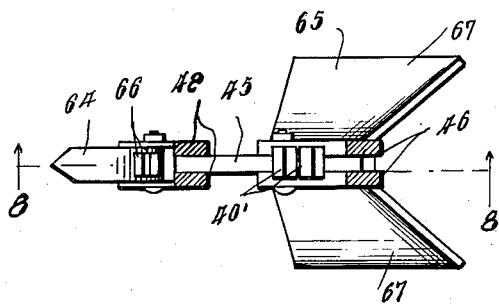
Figure 7 is a horizontal section taken on the line 7—7 of Figure 6.
Figure 8:
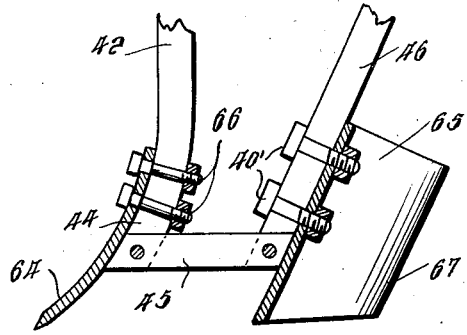
Figure 8 is a vertical section taken on the line 8—8 of Figure 7.
Figures 9, 10:
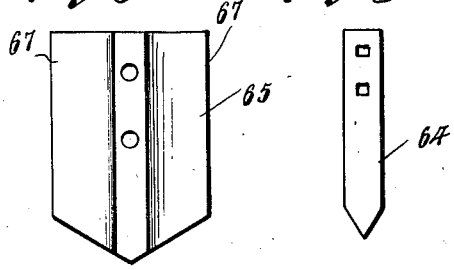
Figure 9 is a front elevation of the rear crowning shovel.
Figure 10 is a front elevation of the front crowning shovel.

In the form of the invention shown in Figures 1 to 5, crowning tools 37 are employed, which are in the form generally of V-shaped flat shares, with their apices foremost, as best shown in Figure 1, the central tool 37 having lateral extensions as at 37', to overlap the path of cutting of the other tools, so that complete crowning will be assured. Such tools 37 have posts 38 rising from the front thereof which are rigidly but adjustably clamped to the associated beam 28 as by means of a U-bolt or the equivalent 39. Adjacent the rear of tools 37, they have upwardly inclined attaching shanks as at 40. The tool mounting is generally designated 41 and in the consideration thereof Figures 7 and 8 should be taken into account. This mounting at the front has two laterally spaced bars 42 which are bolted, riveted or otherwise secured as at 43 at their upper portions, to opposite sides of the associated beam 28. Their lower ends are preferably curved forwardly as at 44. Between the bars 42, at their lower ends, a bar 45 fits, being bolted, welded, riveted or otherwise rigidly secured in place. At the rear end, such bar 45 is disposed between the lower ends of straight upwardly inclined and spaced apart bars 46, being riveted, welded, bolted or otherwise secured thereto. At the upper ends, bars 46 are connected by a bolt 47 to the adjacent beam 28.

Reverting to the cranks or arms 36, they are pivoted at 49 to links 50 which are in turn pivoted to the aforesaid bolt 47.

A hand lever 51 is disposed relatively close to a driver's seat 52, for operation through the medium of a link 53, to move crank 35, to rock rod 33, and cause the cranks 36 to lift the rear ends of the beams 28 and the implements 37, to any height or angle desired. Lever 51 is pivoted at 54 to a rack 55 with which a conventional latching or lock mechanism 56, on the lever, co-acts.

The frame 10, as a whole may be lifted at the front end to vary the elevation of the implements 37 or their angle as desired. To this end, a lever 57 is pivoted at 58 to a rack 59 with which a conventional latching or locking mechanism 60 co-acts. Lever 57 has a crank 61 thereon to which a link 62 is pivoted and which in turn is pivoted at 63 to frame 10.

As shown in Figures 6 to 10, the crowning implements or tools 37 may be removed and in lieu thereof, corrugating shovels employed on each tool mounting as at 64 and 65. The tools 64 are somewhat curved in conformity with the curvature 44 and are fastened in place by bolts 66 passing through the space between the bars 42. The rear shovel 65 has lateral wings 67 so as to impart the desired width to the corrugations, and such shovels are secured in place by means of bolts 40', extending between the bars 46. In fact the bolts 40' are used either to secure the shanks 40 in place or the shovels 65.

Various changes may be resorted to provided they fall within the spirit and scope of the invention.

I claim as my invention:

1. A machine of the class described having a wheeled frame, a beam pivoted at the front to said frame, earth-engaging means operatively connected to the beam and to the frame, depth and angle regulating means connected to the frame, means operable to lower the forward portion of the frame, a tongue on which the latter means are mounted, means pivotally connecting the tongue to the axle of the wheeled means, clevis means depending from the tongue, and a pivotal connection from said clevis to the front end of the frame.

2. A machine of the class described having a frame, an axle on said frame, wheels on said axle, a draft tongue pivoted on said axle, means for varying the elevation of the front portion of the frame mounted on said tongue, a connection flexibly connected to the forward end of the frame and the tongue, a beam pivoted adjacent the forward end of the frame, an implement carried by the beam rearwardly of its pivot, and an elevation and angle adjusting means mounted on the frame connected to said implement.

3. A machine of the class described having a frame, an axle on said frame, wheels on said axle, a draft tongue pivoted on said axle, means for varying the elevation of the front portion of the frame mounted on said tongue, a connection flexibly connected to the forward end of the frame and the tongue, a beam pivoted adjacent the forward end of the frame, an implement carried by the beam rearwardly of its pivot, an elevation and angle adjusting means mounted on the frame connected to said implement, and to said frame.

4. A mounting means for a corrugating shovel or crowner comprising a pair of spaced vertical bars adapted for attachment adjacent their tops to an implement, a bar interposed between said first mentioned bars adjacent the base of the latter and rigid therewith, a pair of bars rigid with and rising one on each of opposite sides of the second mentioned bar in spaced relation and adapted at its top for connection to an implement, the spaces between said bars providing slots to accommodate attaching means for the corrugating tool or crowning tool.

5. A mounting means for a corrugating shovel or crowner comprising a pair of spaced vertical bars adapted for attachment adjacent their tops to an implement, a bar interposed between said first mentioned bars adjacent the base of the latter and rigid therewith, a pair of bars rigid with and rising one on each of opposite sides of the second mentioned bar in spaced relation and adapted at its top for connection to an implement, the spaces between said bars providing slots to accommodate attaching means for the corrugating tool or crowning tool, the first mentioned bars being arcuate at their lower portions to conform to the curvature of the corrugating tool.

6. A machine of the class described having a frame, a beam pivoted to the frame, bars connected to and depending from the beam, a lower bar disposed intermediate the first mentioned bars adjacent the lower end thereof and extending rearwardly therefrom, upwardly and rearwardly extending bars one on each side of said lower bar rigidly connected to the latter in spaced relation to the first mentioned bars, a tool mounted by said bars, means connecting the last mentioned bars to the beam, a rod journaled on the frame, cranks extending from said rod, and links pivoted to the cranks and to said fastening means, and means operable to rock said rod.

JOSIAH R. THOMAS.